Feb. 22, 1966   S. S. ELLIOTT ETAL   3,235,976
EDUCATIONAL APPARATUS
Filed Dec. 23, 1963
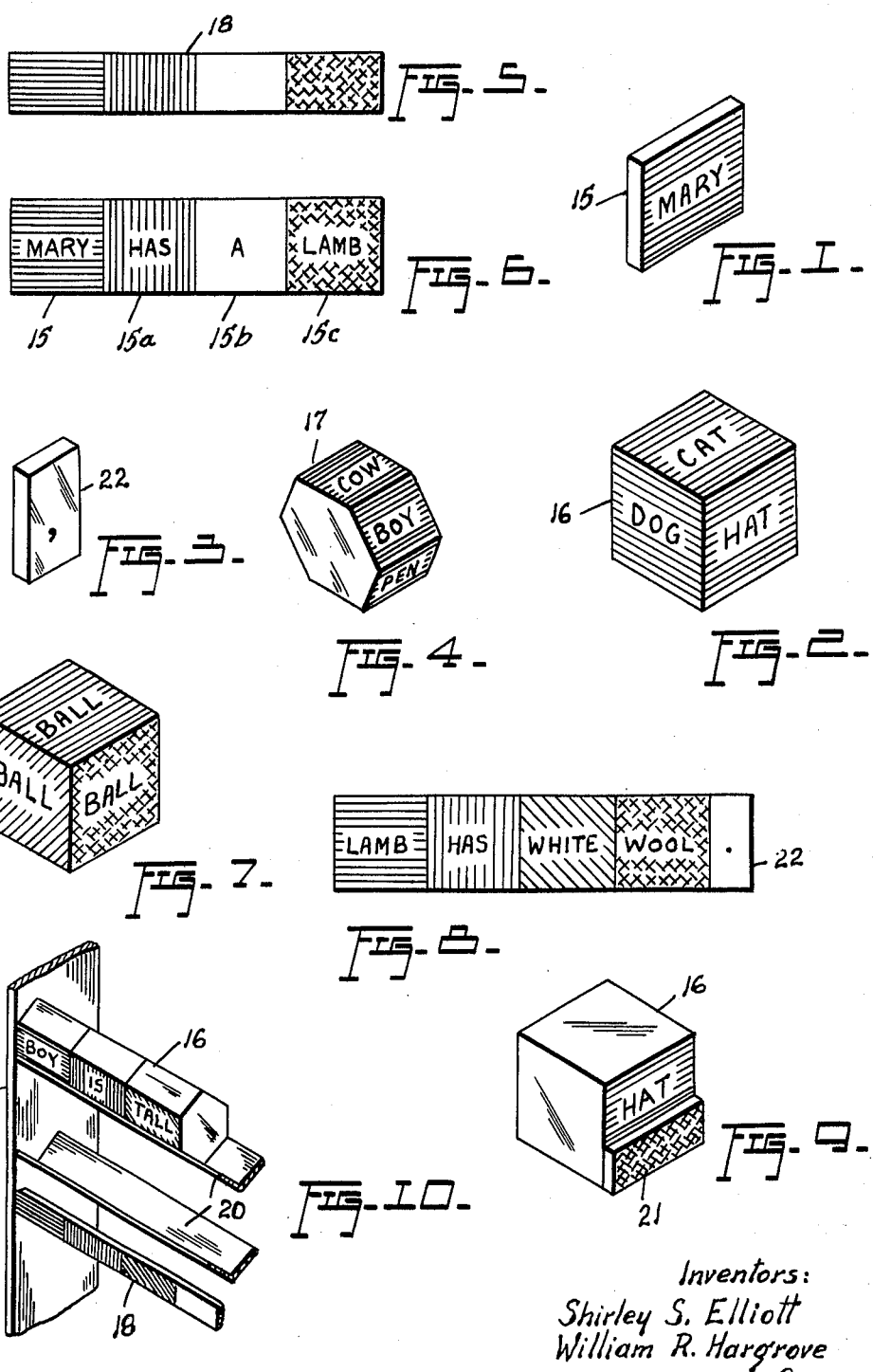
Inventors:
Shirley S. Elliott
William R. Hargrove
By: Munson H. Lamb Atty.

United States Patent Office 3,235,976
Patented Feb. 22, 1966

3,235,976
EDUCATIONAL APPARATUS
Shirley S. Elliott, Dallas, and William R. Hargrove, Denton, Tex., assignors of one-third to Jay M. Goltz, Dallas, Tex.
Filed Dec. 23, 1963, Ser. No. 332,509
5 Claims. (Cl. 35—35)

This invention relates to new and useful improvements in educational apparatus, and more particularly, the invention concerns itself with apparatus for teaching languages by grammatical construction of sentences.

Conventional method of teaching language structure are analytic rather than synthetic in nature, while a person attempting to learn uses a synthetic, creative process of thinking. Thus, it is often difficult for the student to follow the teacher's line of reasoning, especially when children, deaf persons or foreign-speaking persons are being taught.

The principal object of the invention is to eliminate this difficulty, this being attained by the provision of apparatus utilizing variously colored blocks with words thereon, together with a color code coordinated with grammatical parts of speech, whereby the blocks may be grouped together in a predetermined manner so that the words thereon construct a grammatically correct sentence.

Other objects, features and advantages of the invention will become apparent from the following description taken in conjunction with the accompanying drawings, wherein like characters of reference are used to designate like parts, and wherein:

FIGURE 1 is an isometric view of one of the blocks such as may be used in the apparatus;

FIGURE 2 is an isometric view showing another form of the blocks;

FIGURE 3 is an isometric view of another block form;

FIGURE 4 is an isometric view of another block form;

FIGURE 5 is a plan view of a color code;

FIGURE 6 is a plan view of blocks arranged in accordance with the color code;

FIGURE 7 is an isometric view of another block arrangement;

FIGURE 8 is a plan view of blocks utilizing the block arrangement of FIGURE 7;

FIGURE 9 is an isometric view of a block with an identifying tab applied thereto; and FIGURE 10 is a fragmentary perspective view of a rack for holding blocks and the color code.

Referring now to the accompanying drawings in detail, it will be noted that the illustrations are cross-hatched to designate different colors. The specific colors involved are of no moment as long as there is a certain correspondence which will be hereinafter explained. Thus, it will be understood that the particular colors indicated in the drawings and referred to in this specification are for illustrative purposes only and that any other colors may be used, as long as the above mentioned correspondence exists.

The apparatus of the invention comprises a plurality of individual block-shaped members which, as shown at 15 in FIGURE 1, may be relatively flat, or they may be cubical as at 16 in FIGURE 2, or they may have a hexagonal form as at 17 in FIGURE 4, or they may be octagonal, if so preferred. In any event, dealing first with the simple flat block 15 in FIGURE 1, it will be noted that it bears indicia in the form of a word, in this instance the proper noun "Mary." Also, the block has a particular color, in this instance the color blue. The block 15 also appears in FIGURE 6 which additionally contains similar other blocks 15a, 15b and 15c. The block 15a bears a verb, namely, "has" and is colored red. The block 15b bears an article, namely, "a" and is colored white or beige. Finally, the block 15c bears a noun, namely, "lamb" and is colored orange. The various colors are coordinated with different parts of speech, as for example, Noun in a nominative case (subject) _____ Blue.
Verb (predicate) _____ Red.
Article _____ White or Beige.
Noun in an objective case (object) _____ Orange.

In accordance with proper grammatical sentence construction which dictates that the subject comes first, the predicate next, and the object after that, a color code indicated at 18 in FIGURE 5 is provided, wherein the colors blue, red, white or beige and orange appear in progressive succession from left to right, corresponding to the proper arrangement of parts of speech in a sentence. Accordingly, a student may select several blocks with different words thereon, and by simply relating the color of the blocks to the color code, the student is able to group the blocks together and construct a sentence with the various parts of speech arranged in proper grammatical progression, as will be apparent from the arrangement of blocks in FIGURE 6 which follows the color code of FIGURE 5.

Of course, several blocks are provided to accommodate different words and if multi-sided blocks of the type shown at 16 or 17 in FIGURES 2 and 4 are used, the several sides of the block may carry several different words in the same part of speech, the block being uniformly colored on all its sides.

However, there are instances when the same word may be selectively used as two or more different parts of speech, for example, the word "lamb" may be used as the object in the block arrangement of FIGURE 6, or as the subject in the block arrangement of FIGURE 8. For this purpose a block such as is shown in FIGURE 7 may be provided, wherein the same word is carried on two or more sides of the block but the sides are colored differently. Thus, if the word is a noun, for example, one side of the block may be blue for use of the noun as subject, one side may be orange for use of the same noun as the object of a verb, and another side may be brown for use of the same noun as the object of a preposition.

Apart from different colors, different shades of color may be also utilized to accommodate different grammatical situations, particularly in more advanced teaching courses. For illustrative purposes, the following color code examples are given:

Nominative case _____ Blue.
    Nouns—singular _____ Dark blue.
    Nouns—plural _____ Blue-green.
    Proper nouns _____ Light blue.
    Pronouns _____ Light blue.
Predicate _____ Red
    Intransitive verbs _____ Dark red.
    Connecting verbs _____ Light red.
    Transitive verbs _____ Red-orange.
Objective case _____ Orange.
    Nouns _____ Dark orange.
    Proper nouns _____ Light orange.
    Pronouns _____ Light orange.
Adjectives _____ Green.
Adverbs _____ Pink.
Prepositions _____ Brown.
Conjunctions _____ White.
Articles _____ Beige.
Punctuation marks _____ Beige.

It is to be understood, of course, that the color code 18 may be simple as shown in FIGURE 5 to provide for only a few parts of speech such as the subject, predicate and object, or it may be more involved to also include articles, adjectives, adverbs, et cetera. Such color codes may be prepared in advance by the teacher to be followed by the student in arranging the blocks for a particular lesson in sentence construction.

As a matter of convenience, the blocks may be arranged and also stored in a suitable rack 19 with slanted shelves 20 as shown in FIGURE 10 to receive the blocks. The color code 18 is also provided on the rack adjacent the blocks. It may be painted on the rack, or printed on a strip of paper attached to the rack, so that the code may be changed when so desired.

FIGURE 9 illustrates a block, such as the block 16, having a side of a particular color carrying a particular word, as for example, a blue side with the word "hat," which is to be used as the subject. However, if the same block is to be utilized with the word "hat" used as an object, an orange colored tab 21 may be removably attached in any suitable manner to the block, so as to denote the use of the word accordingly. It will be apparent that utilization of the colored tab 21 avoids the need for having the same word on differently colored faces of the same block, as in FIGURE 7.

FIGURES 3 and 8 show relatively narrow blocks 22 which may be used to carry punctuation marks.

While in the foregoing there has been described and shown the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. In a language teaching apparatus, the combination of an elongated strip of material separated longitudinally into portions of different colors coordinated with grammatical parts of speech in successive progression corresponding to the arrangement of parts of speech in a sentence, and a plurality of individually manipulable block-like members, each of said members having indicia thereon representing a part of speech and being colored to correspond with the color of that part of speech on said strip, said members being positionable in a row wherein they are arranged according to color in the same successive progression as the colored portions of said strip so that the indicia on said members construct a grammatically correct sentence.

2. The apparatus as defined in claim 1 wherein said individually manipulable members comprise multi-sided blocks, the sides of each block having the same color.

3. The apparatus as defined in claim 1 wherein said individually manipulable members comprise multi-sided blocks, the sides of each block having different colors.

4. The apparatus as defined in claim 1 wherein said individually manipulable members comprise multi-sided blocks, the sides of each block having the same color, and identifying tabs removably attached to said blocks, said tabs being of a different color than the blocks to which they are attached.

5. In a language teaching apparatus, the combination of a rack having a horizontally extending shelf, an elongated strip of material carried by said rack in parallel relation to said shelf, said strip being separated longitudinally into portions of different colors coordinated with grammatical parts of speech in successive progression corresponding to the arrangement of parts of speech in a sentence, and a plurality of individually manipulable block-like members, each of said members having indicia thereon representing a part of speech and being colored to correspond with the color of that part of speech on said strip, said members being positionable in a row on said shelf according to color in the same successive progression as the colored portions of said strip so that the indicia on said members construct a grammatically correct sentence.

References Cited by the Examiner

UNITED STATES PATENTS

| | | | |
|---|---|---|---|
| 140,722 | 7/1873 | Muldaur | 35—71 |
| 341,754 | 5/1886 | Kenyon | 35—71 |
| 2,520,649 | 8/1950 | Northrop | 35—35 |

FOREIGN PATENTS

| | | |
|---|---|---|
| 1,140,606 | 3/1957 | France. |
| 843,911 | 7/1952 | Germany. |
| 397,281 | 8/1933 | Great Britain. |

EUGENE R. CAPOZIO, *Primary Examiner.*

LAWRENCE CHARLES, *Examiner.*

WILLIAM GRIEB, *Assistant Examiner.*